(12) United States Patent
Malik et al.

(10) Patent No.: US 11,899,655 B2
(45) Date of Patent: *Feb. 13, 2024

(54) SYSTEMS AND METHODS FOR ELECTRONIC NOTIFICATION QUEUES

(71) Applicant: Walmart Apollo, LLC, Bentonville, AR (US)

(72) Inventors: Sandeep Malik, Fremont, CA (US); Chintan Pankajkumar Shah, Fremont, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 75 days.

This patent is subject to a terminal disclaimer.

(21) Appl. No.: 17/397,124

(22) Filed: Aug. 9, 2021

(65) Prior Publication Data

US 2021/0365442 A1 Nov. 25, 2021

Related U.S. Application Data

(63) Continuation of application No. 16/294,164, filed on Mar. 6, 2019, now Pat. No. 11,086,851.

(51) Int. Cl.
*G06F 16/23* (2019.01)
*G06F 16/22* (2019.01)
*G06F 9/54* (2006.01)
*G06F 1/22* (2006.01)

(52) U.S. Cl.
CPC ............ *G06F 16/2379* (2019.01); *G06F 1/22* (2013.01); *G06F 9/542* (2013.01); *G06F 9/546* (2013.01)

(58) Field of Classification Search
None
See application file for complete search history.

(56) References Cited

U.S. PATENT DOCUMENTS

| | | | |
|---|---|---|---|
| 5,950,205 A * | 9/1999 | Aviani, Jr. | G06F 16/316 |
| 6,580,786 B1 | 6/2003 | Yarlagadda | |
| 7,103,608 B1 * | 9/2006 | Ozbutun | G06F 16/24557 707/693 |
| 2005/0180321 A1 | 8/2005 | Banks et al. | |
| 2008/0059492 A1 * | 3/2008 | Tarin | G06F 16/221 |
| 2009/0259801 A1 * | 10/2009 | Kilzer | G06F 16/1724 711/E12.008 |

(Continued)

*Primary Examiner* — Son T Hoang
(74) *Attorney, Agent, or Firm* — BRYAN CAVE LEIGHTON PAISNER LLP

(57) ABSTRACT

Systems and methods including one or more processors and one or more non-transitory media storing computing instructions that, when executed on the one or more processors, cause the one or more processors to perform: storing one or more notifications in a data store; receiving a new notification; determining a respective number of notifications in each respective segment of a plurality of approximately equal segments; using the respective number of notifications in each respective segment of the plurality of approximately equal segments to determine a number of the one or more notifications; when the number of the one or more notifications is equal to or greater than a maximum number of notifications, removing at least one notification of the one or more notifications; and before or after removing the at least one notification, storing the new notification in the data store.

20 Claims, 8 Drawing Sheets

(56) References Cited

U.S. PATENT DOCUMENTS

| | | | |
|---|---|---|---|
| 2010/0121697 A1* | 5/2010 | Lin | G06F 16/122 |
| | | | 705/26.1 |
| 2010/0138500 A1* | 6/2010 | Consul | G06F 16/1727 |
| 2013/0063264 A1* | 3/2013 | Oktem | G06F 16/122 |
| | | | 706/50 |
| 2014/0067751 A1* | 3/2014 | Ketkar | G06F 16/254 |
| | | | 707/602 |
| 2017/0093536 A1* | 3/2017 | Yoganathan | G06F 16/172 |
| 2017/0118691 A1* | 4/2017 | Zou | G06F 16/90 |
| 2017/0123928 A1* | 5/2017 | Smith | G06F 16/1727 |
| 2018/0167476 A1 | 6/2018 | Hoffner et al. | |
| 2018/0248825 A1 | 8/2018 | Sedan | |
| 2019/0057101 A1* | 2/2019 | Esserlieu | G06F 16/2358 |
| 2019/0188705 A1* | 6/2019 | Ecker | G06F 16/90335 |

* cited by examiner

SYSTEMS AND METHODS FOR ELECTRONIC NOTIFICATION QUEUES

CROSS REFERENCE TO RELATED APPLICATIONS

This application is a continuation of application Ser. No. 16/294,164, filed Mar. 6, 2019, which is herein incorporated by this reference in its entirety.

TECHNICAL FIELD

This disclosure relates generally to electronic queues, and more particularly in the use of electronic queues to manage computer disk space used to store notifications on one or more database servers.

BACKGROUND

Electronic notification systems have become ubiquitous today, but still suffer from a number of problems inherent in computer systems as a whole. Many electronic notification systems do not have enough memory to store complete records of notifications sent to users. For example, email and text message notification systems are restricted by the amount of memory in the specific device used. This problem is compounded in an enterprise setting, as notifications for a plurality of users must be stored and distributed. Further, enterprise systems generate a larger number of notifications at a faster rate than personal systems. There is a need, therefore, for a system that better manages memory use of a notification system.

BRIEF DESCRIPTION OF THE DRAWINGS

To facilitate further description of the embodiments, the following drawings are provided in which.

Figure 1:
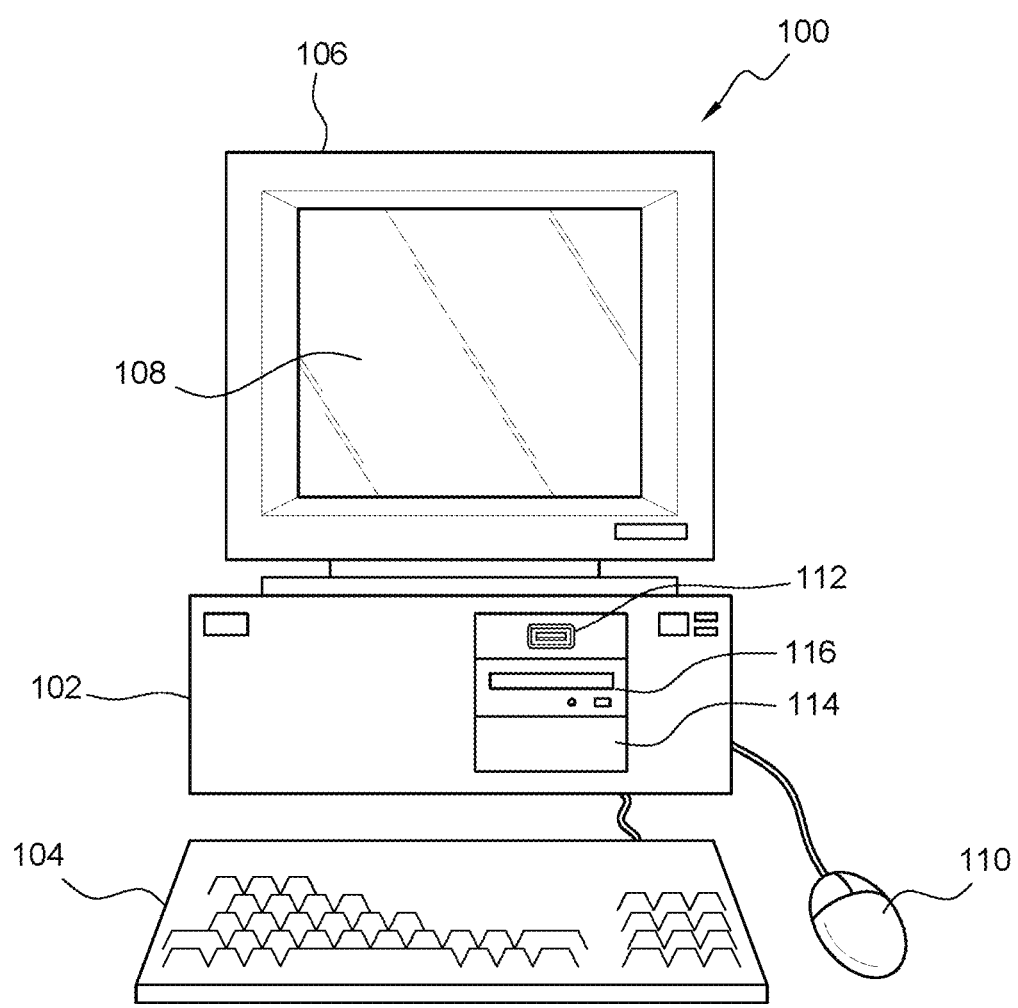
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and perform storing one or more notifications in a data store; receiving a new notification; determining a respective number of notifications in each respective segment of a plurality of approximately equal segments by subtracting a cumulative number of notifications in the plurality of approximately equal segments from a preceding number of notifications in a preceding segment of the plurality of approximately equal segments; using the respective number of notifications in each respective segment of the plurality of approximately equal segments to determine a number of the one or more notifications; when the number of the one or more notifications is equal to or greater than a maximum number of notifications, removing, from the data store, at least one notification of the one or more notifications; and before or after removing the at least one notification, storing the new notification in the data store.

Various embodiments include a method. The method can be implemented via execution of computing instructions configured to run at one or more processors and configured to be stored at non-transitory computer-readable media The method can comprise storing one or more notifications in a data store; receiving a new notification; determining a respective number of notifications in each respective segment of a plurality of approximately equal segments by subtracting a cumulative number of notifications in the plurality of approximately equal segments from a preceding number of notifications in a preceding segment of the plurality of approximately equal segments; using the respective number of notifications in each respective segment of the plurality of approximately equal segments to determine a number of the one or more notifications; when the number of the one or more notifications is equal to or greater than a maximum number of notifications, removing, from the data store, at least one notification of the one or more notifications; and before or after removing the at least one notification, storing the new notification in the data store.

A number of embodiments can include a system. The system can include one or more processors and one or more non-transitory storage devices storing computing instructions configured to run on the one or more processors. The computing instructions can be configured to run on the one or more processors and perform acts of storing one or more notifications in a central data store pursuant to one or more user preferences; receiving a new notification; determining when a number of the one or more notifications is equal to a maximum number of notifications set in the one or more user preferences using a reclamation pointer and an ingestion pointer; when the number of the one or more notifications is equal to the maximum number of notifications, moving the reclamation pointer forward by one or more messages; deleting, from the central data store, notifications of the one or more notifications that are behind the reclamation pointer; storing the new notification with the one or more notifications in the central data store; and facilitating delivery of the new notification of the one or more notifications from the central data store to one or more electronic devices of an organization.

Various embodiments include a method. The method can include storing one or more notifications in a central data store pursuant to one or more user preferences; receiving a new notification; determining when a number of the one or more notifications is equal to a maximum number of notifications set in the one or more user preferences using a reclamation pointer and an ingestion pointer; when the number of the one or more notifications is equal to the maximum number of notifications, moving the reclamation pointer forward by one or more messages; deleting, from the central data store, notifications of the one or more notifications that are behind the reclamation pointer; storing the new notification with the one or more notifications in the central data store; and facilitating delivery of the new notification of the one or more notifications from the central data store to one or more electronic devices of an organization.

Figure 2:
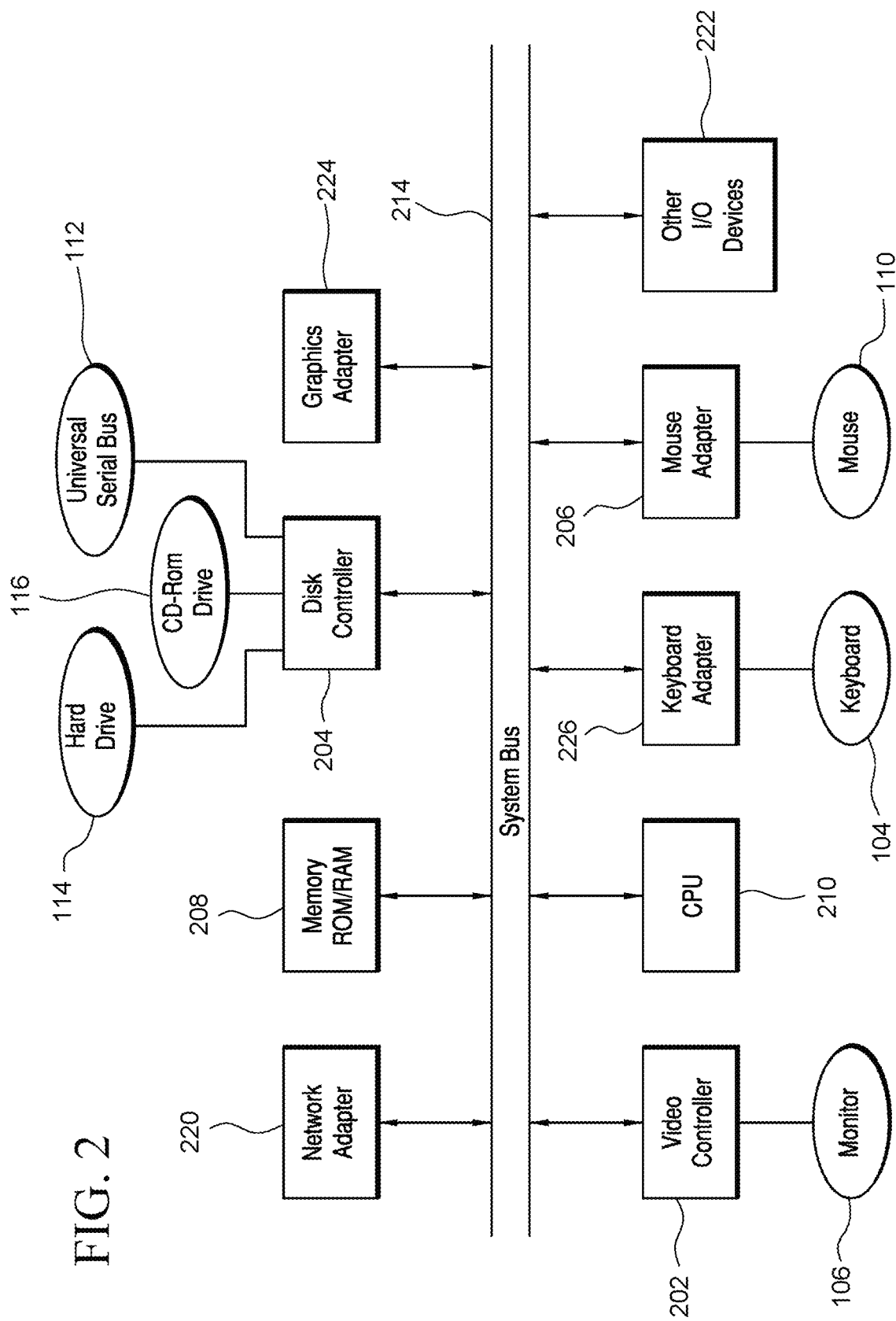
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
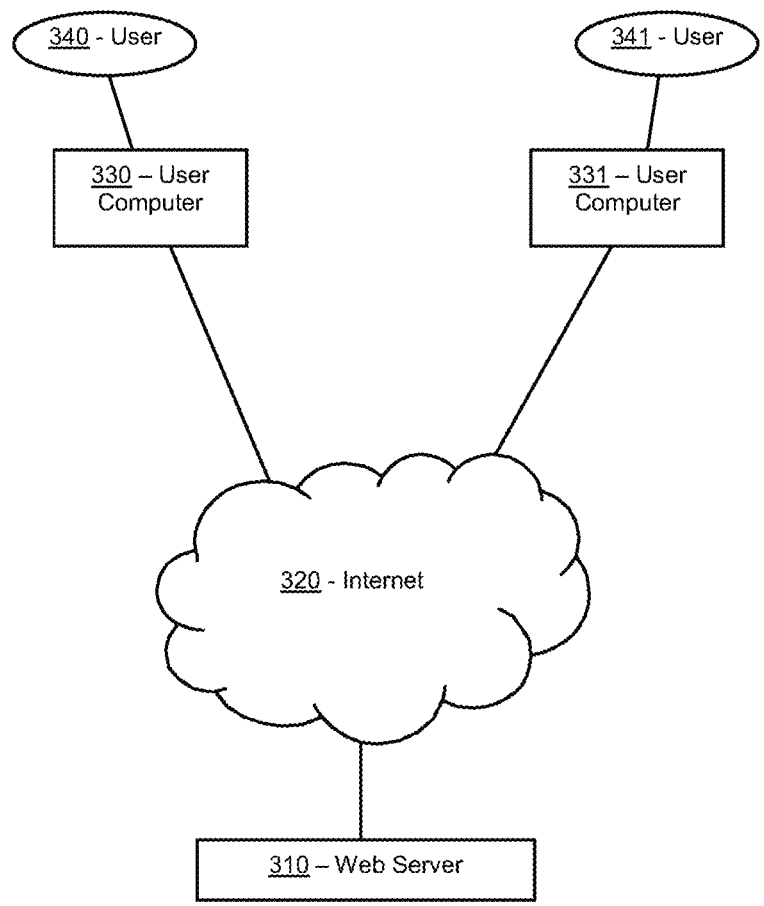
FIG. 3 illustrates a representative block diagram of a system, according to an embodiment.

Turning ahead in the drawings, FIG. 3 illustrates a block diagram of a system 300 that can be employed for a machine learning framework, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a web server 310 and/or an Internet 320. Web server 310 and/or internet 320 can each be a computer system, such as computer system 100 (FIG. 1), as described above, and can each be a single computer, a single server, or a cluster or collection of computers or servers, or a cloud of computers or servers. In another embodiment, a single computer system can host each of two or more of web server 310 and/or internet 320. Additional details regarding web server 310 and/or user internet 320 are described herein.

In many embodiments, system 300 also can comprise user computers 330, 331. User computers 330, 331 can comprise any of the elements described in relation to computer system 100. In some embodiments, user computers 330, 331 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In some embodiments, web server 310 can be in data communication through Internet 320 with user computers 330, 331. In certain embodiments, user computers 330, 331 can be desktop computers, laptop computers, smart phones, tablet devices, and/or other endpoint devices. Web server 310 can host one or more websites. For example, web server 310 can host an eCommerce website that allows users to browse and/or search for products, to add products to an electronic shopping cart, and/or to purchase products, in addition to other suitable activities.

In many embodiments, web server 310, Internet 320, and/or user computers 330, 331 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s)

and/or the memory storage module(s) web server 310, Internet 320, and/or user computers 330, 331 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of web server 310, Internet 320, and/or user computers 330, 331. In a similar manner, the processing module(s) and the memory storage module(s) can be local and/or remote to each other.

In many embodiments, web server 310 can be configured to communicate with one or more user computers 330, 331. In some embodiments, user computers 330, 331 also can be referred to as customer computers. In some embodiments, web server 310 can communicate or interface (e.g., interact) with one or more customer computers (such as user computers 330, 331) through a network or Internet 320, which can be a public or private network. Internet 320 can be an intranet that is not open to the public. Accordingly, in many embodiments, web server 310 (and/or the software used by such systems) can refer to a back end of system 300 operated by an operator and/or administrator of system 300, and user computers 330, 331 (and/or the software used by such systems) can refer to a front end of system 300 used by one or more users 340, 341, respectively. In some embodiments, users 340, 341 also can be referred to as customers, in which case, user computers 330, 331 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, web server 310 and/or user computers 330, 340 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between web server 310, internet 320, user computers 330, 331, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

As the use of electronic notification systems continues to become more common, increasing burdens are being placed on computer storage systems to retain full copies of all their user's notifications. When storage becomes low on notification systems due to a large number of messages, slowdowns can harm the functioning of the overall system and the user experience of those receiving the notifications. Further, purchasing new storage devices and/or new notification systems can be cost prohibitive. The systems and methods disclosed herein provide a solution to one or more of the computer system problems identified above by treating message storage as an electronic queue, and then restricting the messages stored in the queue based upon user supplied parameters.

In many embodiments, the techniques described herein can provide a practical application and several technological improvements. In some embodiments, the techniques described herein can provide for better storage management for a notification system. These techniques described herein can provide a significant improvement over conventional approaches, which did not actively manage storage in a notification system.

In many embodiments, the techniques described herein can be used continuously at a scale that cannot be handled using manual techniques. For example, the number of daily notifications can easily exceed a few million.

Figure 4:
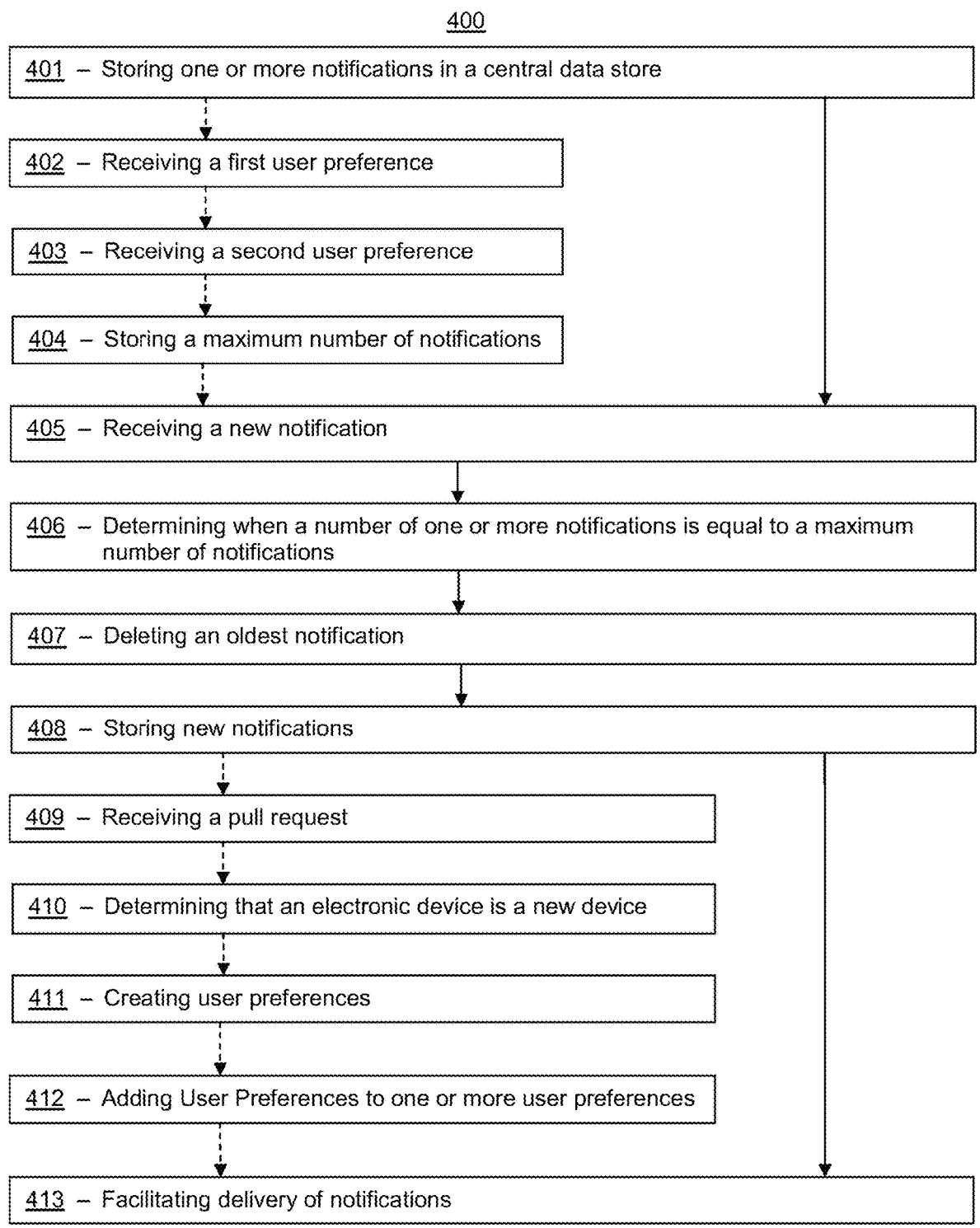
FIG. 4 is a flowchart for a method, according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as system 100 (FIG. 1) and/or system 300 (FIG. 3). The processing module(s) can be similar or identical to the processing module(s) described above with respect to computer system 100 (FIG. 1).

In many embodiments, method 400 can comprise an activity 401 of storing one or more notifications in a central data store. In many embodiments, a notification can comprise an electronic notification, such as an email, a text message, a push notification, etc. In the same or different embodiments, a notification can comprise information about one or more items on a website of an eCommerce retailer. For example, a notification can comprise information about sold items, returned items, lost sales opportunities, lost advertising opportunities, successful advertising opportunities, etc. In the same or different embodiments, one or more notifications can be stored in an order they were received. In various embodiments, one or more notifications can be stored in an electronic queue, such as an ordered database, electronic list, or other ordered structures for storing an electronic queue.

In many embodiments, a notification can be stored pursuant to one or more user preferences. In various embodiments, one or more user preferences can comprise one or more formatting preferences, one or more delivery preferences, and/or one or more storage preferences. In some embodiments, one or more delivery preferences can comprise a push notification or a pull notification. In the same or different embodiments, a push notification can comprise a notification that is actively sent to an electronic device of a user without waiting for the electronic device to request the notification. In various embodiments, a pull notification can comprise a notification that is stored in a central data store of a queueing system and can be retrieved by an electronic device of a user when requested by the electronic device. In some embodiments, when a user preference indicates the user wants pull notifications, a storage preference also can be obtained. In many embodiments, a storage preference can comprise a time bound preference and/or a number bound preference. In some embodiments, a time bound preference can comprise a predetermined amount of time a message can be stored. In the same or different embodiments, a number bound preference can comprise a maximum number of messages stored. In the same or different embodiments, one or more notifications can be stored in an order they were received. In various embodiments, one or more notifications can be stored as an electronic queue in a database, table, and/or array storing notifications.

Next, in many embodiments, method 400 can optionally comprise an activity 402 of receiving a first user preference. In various embodiments, a first user preference can comprise a user preference as described in activity 401. In the same or different embodiments, a first user preference can comprise a maximum number of messages. In many embodiments, activity 402 can comprise receiving a plurality of user preferences from a plurality of users. In many embodiments, each user preference of a plurality of user preferences can comprise a different maximum numbers of messages. In these embodiments, a largest number of the different maximum numbers of messages can be determined. In the same or different embodiments, a user preference comprising a largest number of the different maximum numbers of messages can be determined to be a first user preference. In this way, a first user preference can define a maximum number of messages that can be stored on a central data store on behalf of the entire organization. In other embodiments, the first user preferences can define a maximum number of messages that can be stored on a central data store on behalf of the user who set the first user preferences, such that each user of the organization can set his or her own maximum number of messages to be stored.

In many embodiments, method 400 can continue after activity 402 by optionally comprising an activity 403 of receiving a second user preference. In various embodiments, a second user preference can comprise a user preference as described in activity 401. In the same or different embodiments, a second user preference can comprise a predetermined amount of time a message can be stored. In various embodiments, a predetermined amount of time can comprise 1 hour, 2 hours, 3 hours, 4 hours, 5 hours, 18 hours, 1 day, 2 days, 3 days, 4 days, 5 days, 20 days, 1 month, 2 months, 3 months, 4 months, 5 months, 9 months, 1 year, 2 years, 3 years, 4 years, 5 years, etc. In many embodiments, activity 403 can comprise receiving a plurality of different user preferences from a plurality of users. In some embodiments, each user preference of a plurality of user preferences can comprise a different predetermined amount of time a message can be stored. In these embodiments, a user preference comprising a longest predetermined amount of time a message can be stored can be determined to be a second user preference. In this way, a second user preference can define a predetermined amount of time that a message can be stored on a central data store.

In many embodiments, method 400 can continue after activity 403 by optionally comprising an activity 404 of storing a maximum number of notifications. In various embodiments, a notification can be stored in a central data store, as described above. In the same or different embodiments, a notification can be stored only when the notification was created within a shorter amount of time than a predetermined amount of time (e.g., a notification is younger than a maximum age of notifications stored in a central data store). In the same or different embodiments, a notification can be stored only when the notification fits within the number bound preference.

In many embodiments, method 400 can comprise an activity 405 of receiving a new notification. Activity 405 an occur after activity 401, and also can occur after activities 402-404 (if performed). In the same or different embodiments, a new notification can comprise a notification that has not been stored in a central data store. In some embodiments, a new notification can comprise a notification as described in activity 401. In the same or different embodiments, a new notification can be received from a delivery agent after it has been formatted for a user.

Next, in many embodiments, method 400 can comprise an activity 406 of determining when a number of one or more notifications is equal to a maximum number of notifications. In some embodiments, a maximum number of notifications can be with regards to a central data store, as described in activity 404.

Figure 5:
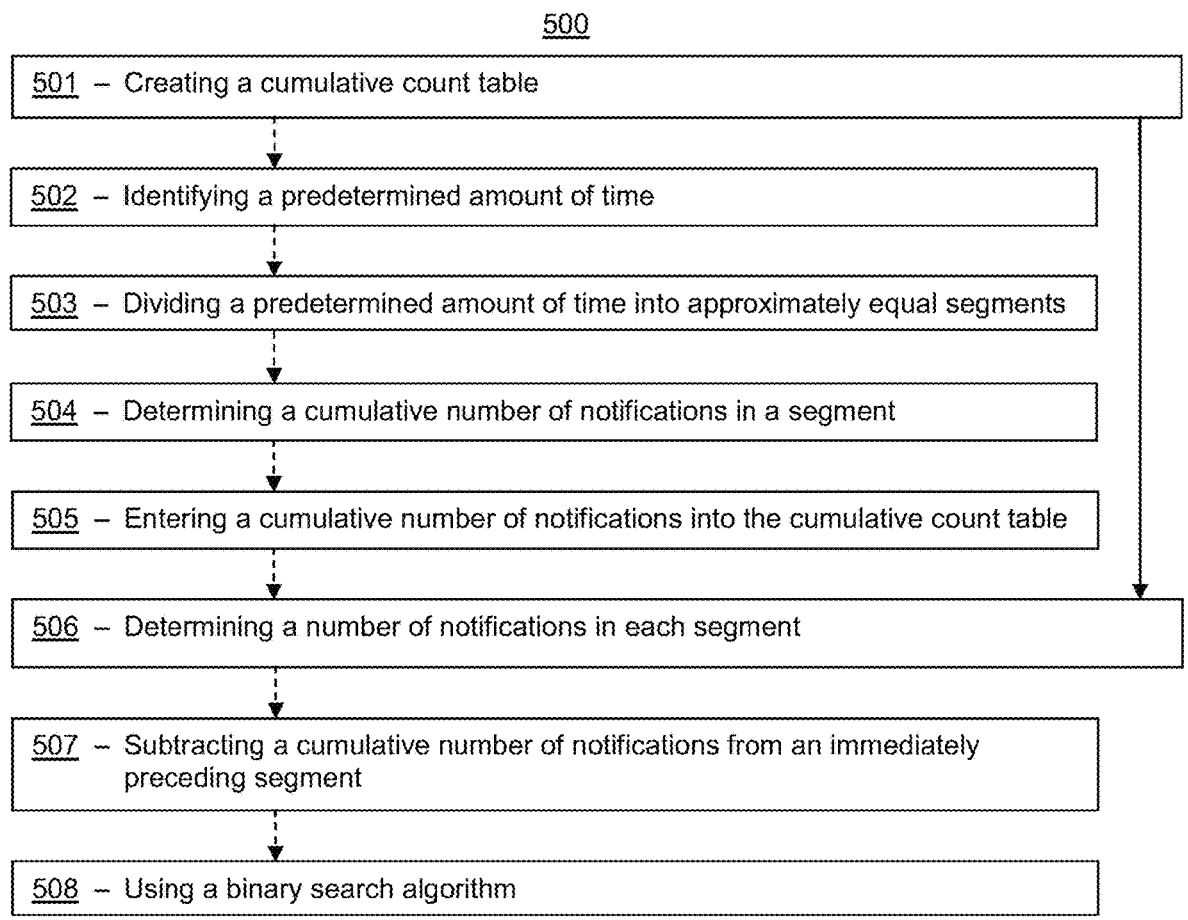
FIG. 5 is a flowchart for a method, according to certain embodiments.

Turning ahead in the drawings, FIG. 5 illustrates a flow chart for a method 500, according to an embodiment. In some embodiments, method 500 can be an example of at least a portion of activity 406 (FIG. 4). Method 500 is merely exemplary and is not limited to the embodiments presented herein. Method 500 can be employed in many different embodiments or examples not specifically depicted or described herein. In some embodiments, the activities of method 500 can be performed in the order presented. In other embodiments, the activities of method 500 can be performed in any suitable order. In still other embodiments, one or more of the activities of method 500 can be combined or skipped. In many embodiments, system 300 (FIG. 3) can be suitable to perform method 500 and/or one or more of the activities of method 500. In these or other embodiments, one or more of the activities of method 500 can be implemented as one or more computer instructions configured to run at one or more processing modules and configured to be stored at one or more non-transitory memory storage modules. Such non-transitory memory storage modules can be part of a computer system such as system 100 (FIG. 1) and/or system 300 (FIG. 3). The processing module(s) can be similar or identical to the processing module(s) described above with respect to computer system 100 (FIG. 1). In various embodiments, method 500 can be performed after or be a part of activity 406 (FIG. 4).

In many embodiments, method 500 can comprise an activity 501 of creating a cumulative count table. In many embodiments, a cumulative count table can comprise a database, table, and/or array storing information about a number of notifications stored in a central data store. In some embodiments, a cumulative count table can be created as described in activities 502-505 below.

In many embodiments, method 500 can continue after activity 502 by comprising an activity 502 of identifying a predetermined amount of time. In some embodiments, a predetermined amount of time can comprise a predetermined amount of time a message can be stored as described in activity 401 (FIG. 4). In the same or different embodiments, a predetermined amount of time can be received from an electronic device of a user. For example, when a user wants to store 6 months' worth of notifications on a central data store, a predetermined amount of time can comprise 6 months.

In some embodiments, activity 502 can further comprise placing an ingestion pointer at a head of an electronic queue. In the same or different embodiments, an ingestion pointer can comprise (e.g. be placed at) a current time and/or a current date, and the current time can be continually updated using a system clock. In various embodiments, activity 502 can further comprise placing a reclamation pointer at a tail of an electronic queue. In the same or different embodiments, a reclamation pointer can be placed with regards to a predetermined amount of time as determined in one or more user preferences and an ingestion pointer. In various embodiments, a reclamation pointer can comprise (e.g. be placed at) a past time and a past date as determined with relation to a predetermined amount of time as determined in one or more user preferences and an ingestion pointer. For example, when a predetermined amount of time comprises 6 months, and a current time of an ingestion pointer comprises 1:00 PM on Jul. 1, 2019, then a reclamation pointer can comprise (e.g. be placed at) 1:00 PM on Jan. 1, 2019.

In many embodiments, method 500 can continue after activity 502 by optionally comprising an activity 503 of dividing a predetermined amount of time into approximately equal segments. In the same or different embodiments, a predetermined amount of time can be divided into 1 second, 2 second, 3 second, 4 second, 5 second, 30 second, 1 minute, 2 minute, 3 minute, 4 minute, 5 minute, etc. segments. In various embodiments, each approximately equal segment can be identified relative to a reclamation pointer and an ingestion pointer. For example, when a reclamation pointer comprises 1:00 PM on Jan. 1, 2019, an ingestion pointer comprises 1:05 PM on Jan. 1, 2019, and each approximately equal segment comprises one minute, a predetermined amount of time can be divided into the following approximately equal segments: 1:00 PM on Jan. 1, 2019 to 1:01 PM on Jan. 1, 2019; 1:01 PM on Jan. 1, 2019 to 1:02 PM on Jan. 1, 2019; 1:02 PM on Jan. 1, 2019 to 1:03 PM on Jan. 1, 2019; 1:03 PM on Jan. 1, 2019 to 1:04 PM on Jan. 1, 2019; and 1:04 PM on Jan. 1, 2019 to 1:05 PM on Jan. 1, 2019.

In many embodiments, method 500 can optionally comprise an activity 504 of determining a cumulative number of notifications in a segment. In some embodiments, a cumulative number of notifications in each segment can be determined by maintaining a running count of a number of notifications stored in a central data store. Therefore, in the same or different embodiments, a cumulative number of notifications can be determined by noting a number of notifications in a central data store when a segment is created.

In many embodiments, method 500 can continue after activity 504 by optionally comprising an activity 505 of entering a cumulative number of notifications in each segment into a cumulative count table. In the same or different embodiments, a first column of a cumulative count table can comprise a beginning time and date of each approximately equal segment, and a second column can comprise a corresponding cumulative count of notifications in that segment.

In many embodiments, method 500 also can comprise an activity 506 of determining a number of notifications in each segment. Activity 506 can occur after activity 501, and also can occur after activities 502-505 (if performed). In the same or different embodiments, activity 506 can comprise determining an approximate number of notifications in each segment before determining an exact number of notifications in each segment. In some embodiments, activity 506 can comprise activities 507 and/or 508 as described below. In various embodiments, an approximate number of notifications in each segment is used because calculating an exact number of notifications in each segment using a summing function can be burdensome on a processor due to the large number of notifications that are present in each segment.

Therefore, in order to determine an approximate number of notifications in each segment, in many embodiments method 500 can continue after activity 506 by optionally comprising an activity 507 of subtracting a cumulative number of notifications from an immediately preceding segment. For example, if a cumulative count for a segment spanning 1:04 PM on Jan. 1, 2019 to 1:05 PM on Jan. 1, 2019 comprises 500 messages and a cumulative count for a segment spanning 1:03 PM on Jan. 1, 2019 to 1:04 PM on Jan. 1, 2019 comprises 400, it can be determined that approximately 100 notifications were received from 1:04 PM on Jan. 1, 2019 to 1:05 PM on Jan. 1, 2019 In this way, an approximate count can be determined without running a processor intensive summing operation.

In many embodiments, method 500 can continue after activity 507 by further comprising an activity 508 of using a binary search algorithm. In the same or different embodiments, a binary search algorithm can be used to find an exact number of notifications in a predetermined amount of time. In some embodiments, a binary search algorithm can be used in a first segment (e.g., a segment immediately before an ingestion pointer) and/or a last segment (e.g., a segment immediately after a reclamation pointer). In many embodiments, a binary search can be configured to search a sorted array by iteratively dividing a search interval of the array in half until a specific value is found. In some embodiments, an interval of a binary search can comprise predetermined amount of time or a time period between a reclamation pointer and an ingestion pointer.

Returning now to FIG. 4, after activity 405, in some embodiments, method 400 can comprise an activity 406 of determining when a number of one or more notifications is equal to a maximum number of notifications. In further embodiments, a maximum number of notifications can comprise a maximum number of notifications as determined in a first user preference as described in activity 402. In various embodiments, a number of one or more notifications can comprise a number of notifications stored in a central data store. In some embodiments, an approximate number of notifications can be used to determine when a number of one or more notifications is equal to a maximum number of notifications. In many embodiments, an exact number of notifications can be used to determine when a number of one or more notifications is equal to a maximum number of notifications.

Next, in many embodiments, method 400 can comprise an activity 407 of deleting an oldest notification. In some embodiments, an oldest notification can be determined using a reclamation pointer. In various embodiments, when a number of one or more notifications is determined to be equal to a maximum number of notifications, a reclamation pointer can be moved forward or incremented by one or more notifications. In the same or different embodiments, any notifications behind a reclamation pointer can be deleted. In some embodiments, a notification can be deleted before or after a new notification is stored in a central data store. In many embodiments, deleting a notification can comprise tagging (e.g., marking) a notification for deletion. In various embodiments, notifications tagged for deletion can be removed from a central data store in batches (e.g., the notifications can be tagged and batch deleted). In embodiments where notifications are tagged and batch deleted, processing burdens can be lowered due to the fact that the computer system is not continually deleting notifications as new notifications arrive.

Figure 6:
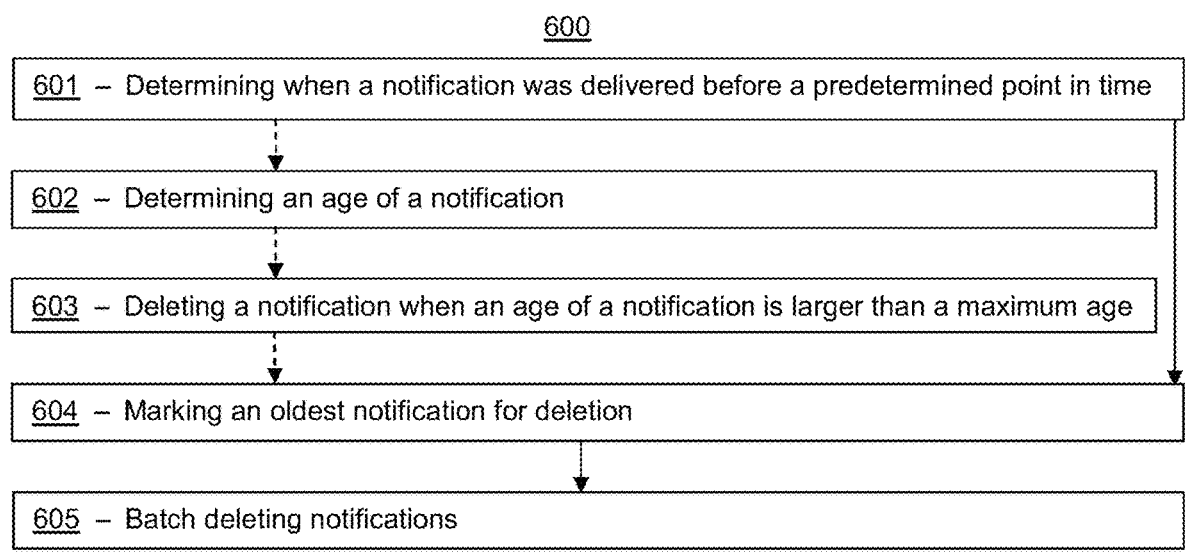
FIG. 6 is a flowchart for a method, according to certain embodiments.

Turning ahead in the drawings, FIG. 6 illustrates a flow chart for a method 600, according to an embodiment. In some embodiments, method 600 can be an example of at least a portion of activity 407 (FIG. 4). Method 600 is merely exemplary and is not limited to the embodiments presented herein. Method 600 can be employed in many different embodiments or examples not specifically depicted or described herein. In some embodiments, the activities of method 600 can be performed in the order presented. In other embodiments, the activities of method 600 can be performed in any suitable order. In still other embodiments, one or more of the activities of method 600 can be combined or skipped. In many embodiments, system 300 (FIG. 3) can be suitable to perform method 600 and/or one or more of the activities of method 600. In these or other embodiments, one or more of the activities of method 600 can be implemented as one or more computer instructions configured to run at one or more processing modules and configured to be stored at one or more non-transitory memory storage modules. Such non-transitory memory storage modules can be part of a computer system such as system 100 (FIG. 1) and/or system 300 (FIG. 3). The processing module(s) can be similar or identical to the processing module(s) described above with respect to computer system 100 (FIG. 1). In various embodiments, method 600 can be performed after, be a part of, and/or run in parallel with activity 406 (FIG. 4).

In many embodiments, method 600 can comprise an activity 601 determining when a notification was delivered before a predetermined point in time. In the same or different embodiments, a predetermined amount of time can be determined from one or more user preferences, as described in activity 403 (FIG. 4). In various embodiments, a notification can be determined to be delivered before a predetermined amount of time by comparing a time of delivery of the notification to a time of a reclamation pointer. In many embodiments, when a notification was delivered before a reclamation pointer, the notification can be determined to be delivered before a predetermined amount of time.

Next, in many embodiments, method 600 can optionally comprise an activity 602 of determining an age of a notification. In many embodiments, an age of a notification can be determined by subtracting a time of delivery of the notification from a time of a reclamation pointer.

In many embodiments, method 600 can continue after activity 602 by comprising an activity 603 of deleting a notification when an age of a notification is larger than a maximum age. In some embodiments, a maximum age can be determined as described with reference to a predetermined amount of time from one or more user preferences, as described in activity 403 (FIG. 4). In the same or different embodiments, a maximum age can be determined by subtracting a time of a reclamation pointer from a time of an ingestion pointer.

In many embodiments, method 600 can continue after activity 603 by comprising an activity 604 of marking an oldest notification for deletion. Activity 604 can occur after activity 601, and also can occur after activities 602-603 (if performed). In the same or different embodiments, activities 601-604 can be repeated in a real time loop to continually determine when old notifications are to be tagged for deletion.

Next, in many embodiments, method 600 can comprise an activity 605 of batch deleting notifications. In some embodiments, a notification can be deleted before or after a new notification is stored in a central data store. In various embodiments, notifications tagged/marked for deletion can be removed from a central data store in batches (e.g., the notifications can be tagged and batch deleted). In embodiments where notifications are tagged and batch deleted, processing burdens can be lowered due to the fact that the computer system is not continually deleting notifications as new notifications arrive.

Returning to FIG. 4, after activity 407, in many embodiments, a method 400 can comprise an activity 408 of storing new notifications. In some embodiments, new notifications can comprise a new notification as described in activity 404. In the same or different embodiments, activity 408 can further comprise incrementing (e.g. advancing) an ingestion pointer by one record. In various embodiments, a new notification can be stored behind an ingestion pointer. In the same or different embodiments, a new notification can be stored immediately behind an ingestion pointer. In this way, a set of notifications stored on a central data store can be stored in an order in which they arrive.

Next, in many embodiments, method 400 can optionally comprise an activity 409 of receiving a pull request. In the same or different embodiments, a pull request can comprise a request to retrieve a set of notifications from a central data store. In some embodiments, a pull request can originate from an electronic device of a user.

In many embodiments, method 400 can continue after activity 409 by comprising an activity 410 of determining that an electronic device of a user is a new device. In the same or different embodiments, an electronic device of a user can be determined to be new when an electronic device of a user does not have at least one subscriber pointer associated with the electronic device of a user. In various embodiments, a subscriber pointer can be similar to an ingestion pointer and/or a reclamation pointer, but, instead of operating to manage a common data store, a subscriber pointer operates to manage one or more user preferences only for an electronic device of a user. For example, a subscriber pointer can determine a maximum number of notifications to return to an electronic device of a user, while a reclamation and an ingestion pointer can determine a maximum number of notifications to store on a central data store.

In many embodiments, method 400 can continue after activity 410 by comprising an activity 411 of creating user preferences. In some embodiments, user preferences can be similar to one or more user preferences as described in activities 402-403. In various embodiments, user preferences created in activity 411 can be for an electronic device of a user that submitted a pull request in activity 409.

In many embodiments, method 400 can continue after activity 411 by comprising an activity 412 of adding user preferences to one or more user preferences. In the same or different embodiments, the user preferences added to the one or more preferences can comprise preferences of an electronic device of a user. In many embodiments, the one or more user preferences can comprise a user preference that manages a number of notifications stored on a central data store, as described above. In many embodiments, user preferences added to one or more user preferences can be compared to the one or more user preferences. In some embodiments, a user preference can be determined to alter preferences that manage a number of notifications stored on a central data store. For example, a user preference can expand a maximum number of notifications stored on a central data store and/or increase a maximum age of a notification. In these embodiments, a reclamation pointer and/or an ingestion pointer can be modified accordingly to accommodate the new storage constraints.

In many embodiments, method 400 can comprise an activity 413 of facilitating delivery of notifications. Activity 413 can occur after activity 408, and also can occur after activities 409-412 (if performed). In the same or different embodiments, notifications can be delivered from the central data store to an electronic device of a user. In various embodiments, notifications can be delivered to a plurality of electronic devices of users in an organization based upon preferences of each user of the plurality of users. For example, if a company subscribes to a notification system, each employee of the company can set their own delivery preferences for notifications that can be delivered after a pull request.

Figure 7:
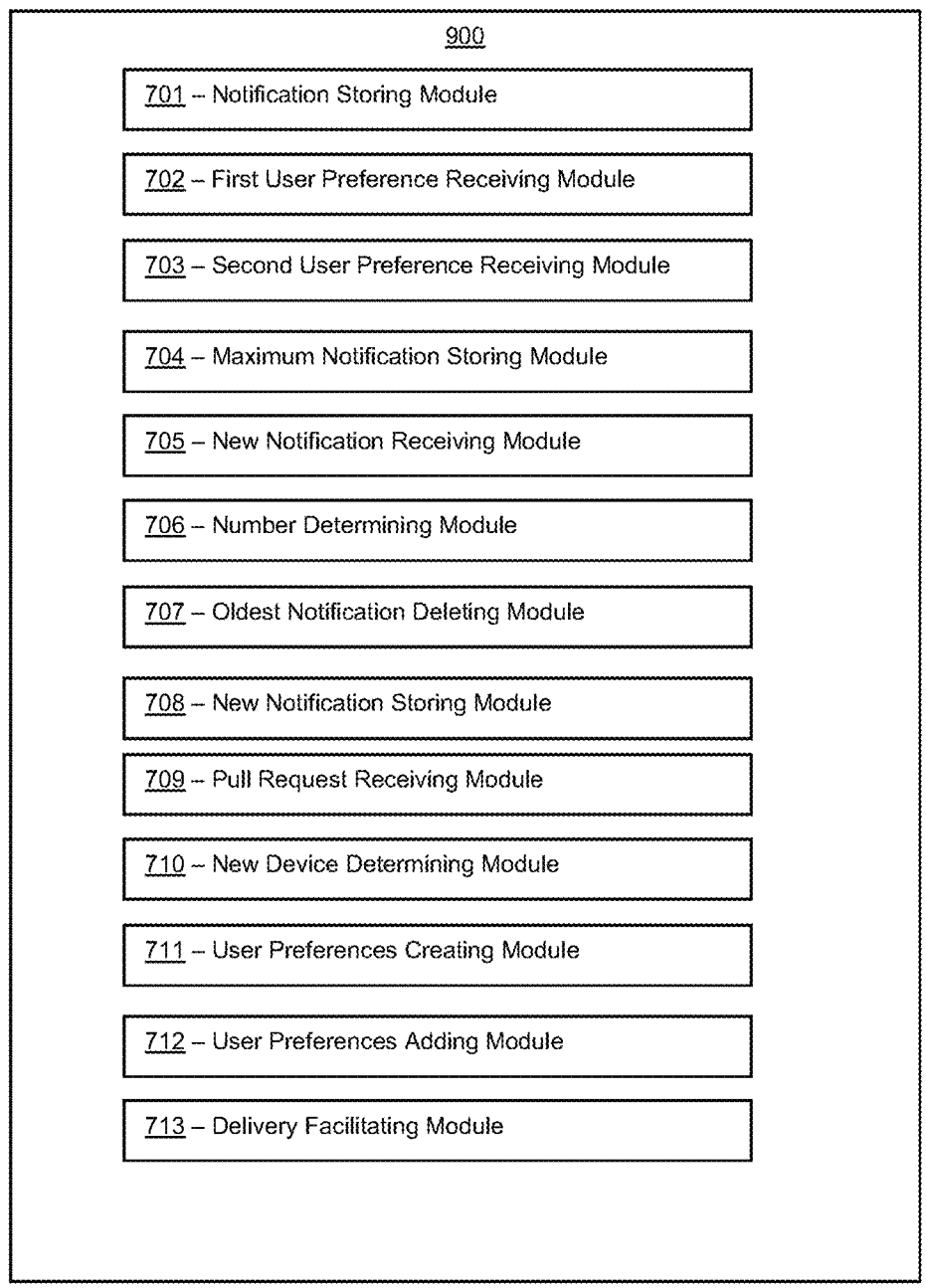
FIG. 7 illustrates a representative block diagram of a system, according to an additional embodiment.

Turning ahead in the drawings, FIG. 7 illustrates a block diagram of a system 700 that can be employed for electronic notification queues. System 700 is merely exemplary and embodiments of the system are not limited to the embodiments presented herein. System 700 can be employed in many different embodiments or examples not specifically depicted or described herein. In some embodiments, certain elements or modules of system 700 can perform various procedures, processes, and/or activities of method 400 (FIG. 4). In these or other embodiments, the procedures, processes, and/or activities of method 400 (FIG. 4) can be performed by other suitable elements or modules of system 700.

Generally, therefore, system 700 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 700 described herein.

In many embodiments, system 700 can comprise non-transitory memory storage module 701. Memory storage module 701 can be referred to as notification storing module 701. In many embodiments, notification storing module 701 can store computing instructions configured to run on one or more processing modules and perform one or more acts of method 400 (FIG. 4) (e.g., activity 401 (FIG. 4)).

In many embodiments, system 700 can comprise non-transitory memory storage module 702. Memory storage module 702 can be referred to as first user preference receiving module 702. In many embodiments, first user preference receiving module 702 can store computing instructions configured to run on one or more processing modules and perform one or more acts of method 400 (FIG. 4) (e.g., activity 402 (FIG. 4)).

In many embodiments, system 700 can comprise non-transitory memory storage module 703. Memory storage module 703 can be referred to as second user preference receiving module 703. In many embodiments, second user preference receiving module 703 can store computing instructions configured to run on one or more processing modules and perform one or more acts of method 400 (FIG. 4) (e.g., activity 403 (FIG. 4)).

In many embodiments, system 700 can comprise non-transitory memory storage module 704. Memory storage module 704 can be referred to as maximum notification storing module 704. In many embodiments, maximum notification storing module 704 can store computing instructions configured to run on one or more processing modules and perform one or more acts of method 400 (FIG. 4) (e.g., activity 404 (FIG. 4)).

In many embodiments, system 700 can comprise non-transitory memory storage module 705. Memory storage module 705 can be referred to as new notification receiving module 705. In many embodiments, new notification receiving module 705 can store computing instructions configured to run on one or more processing modules and perform one or more acts of method 400 (FIG. 4) (e.g., activity 405 (FIG. 4)).

In many embodiments, system 700 can comprise non-transitory memory storage module 706. Memory storage module 706 can be referred to as number determining module 706. In many embodiments, number determining module 706 can store computing instructions configured to run on one or more processing modules and perform one or more acts of method 400 (FIG. 4) (e.g., activity 406 (FIG. 4)).

In many embodiments, system 700 can comprise non-transitory memory storage module 707. Memory storage module 707 can be referred to as oldest notification deleting module 707. In many embodiments, oldest notification deleting module 707 can store computing instructions configured to run on one or more processing modules and perform one or more acts of method 400 (FIG. 4) (e.g., activity 407 (FIG. 4)).

In many embodiments, system 700 can comprise non-transitory memory storage module 708. Memory storage module 708 can be referred to as new notification storing module 708. In many embodiments, new notification storing module 708 can store computing instructions configured to run on one or more processing modules and perform one or more acts of method 400 (FIG. 4) (e.g., activity 408 (FIG. 4)).

In many embodiments, system 700 can comprise non-transitory memory storage module 709. Memory storage module 709 can be referred to as pull request receiving module 709. In many embodiments, pull request receiving module 709 can store computing instructions configured to run on one or more processing modules and perform one or more acts of method 400 (FIG. 4) (e.g., activity 409 (FIG. 4)).

In many embodiments, system 700 can comprise non-transitory memory storage module 710. Memory storage module 710 can be referred to as new device determining module 710. In many embodiments, new device determining module 710 can store computing instructions configured to run on one or more processing modules and perform one or more acts of method 400 (FIG. 4) (e.g., activity 410 (FIG. 4)).

In many embodiments, system 700 can comprise non-transitory memory storage module 711. Memory storage module 711 can be referred to as user preferences creating module 711. In many embodiments, user preferences creating module 711 can store computing instructions configured to run on one or more processing modules and perform one or more acts of method 400 (FIG. 4) (e.g., activity 411 (FIG. 4)).

In many embodiments, system 700 can comprise non-transitory memory storage module 712. Memory storage module 712 can be referred to as user preferences adding module 712. In many embodiments, user preferences adding module 712 can store computing instructions configured to run on one or more processing modules and perform one or more acts of method 400 (FIG. 4) (e.g., activity 412 (FIG. 4)).

In many embodiments, system 700 can comprise non-transitory memory storage module 713. Memory storage module 713 can be referred to as delivery facilitating module 713. In many embodiments, delivery facilitating module 713 can store computing instructions configured to run on one or more processing modules and perform one or more acts of method 400 (FIG. 4) (e.g., activity 413 (FIG. 4)).

Figure 8:
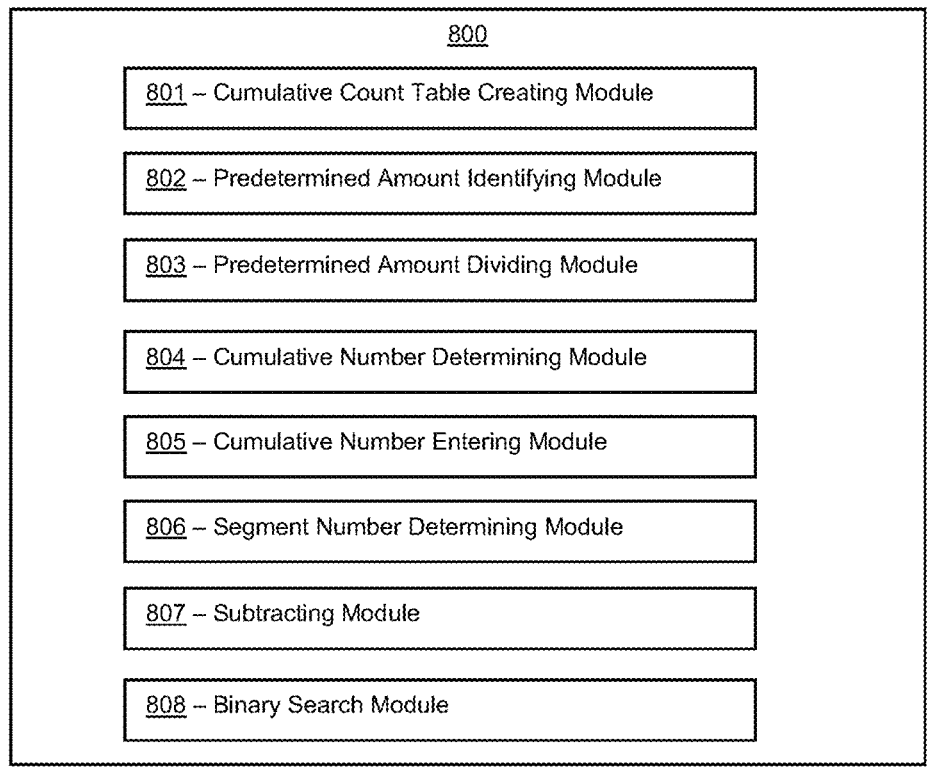
FIG. 8 illustrates a representative block diagram of a system, according to an additional embodiment.

Turning ahead in the drawings, FIG. 8 illustrates a block diagram of a system 800 that can be employed for electronic notification queues. System 800 is merely exemplary and embodiments of the system are not limited to the embodiments presented herein. System 800 can be employed in many different embodiments or examples not specifically depicted or described herein. In some embodiments, certain elements or modules of system 800 can perform various procedures, processes, and/or activities of method 500 (FIG. 5). In these or other embodiments, the procedures, processes, and/or activities of method 500 (FIG. 5) can be performed by other suitable elements or modules of system 800.

Generally, therefore, system 800 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 800 described herein.

In many embodiments, system 800 can comprise non-transitory memory storage module 801. Memory storage module 801 can be referred to as cumulative count table creating module 801. In many embodiments, cumulative count table creating module 801 can store computing instructions configured to run on one or more processing modules and perform one or more acts of method 500 (FIG. 5) (e.g., activity 501 (FIG. 5)).

In many embodiments, system 800 can comprise non-transitory memory storage module 802. Memory storage module 802 can be referred to as predetermined amount identifying module 802. In many embodiments, predetermined amount identifying module 802 can store computing instructions configured to run on one or more processing modules and perform one or more acts of method 500 (FIG. 5) (e.g., activity 502 (FIG. 5)).

In many embodiments, system 800 can comprise non-transitory memory storage module 803. Memory storage module 803 can be referred to as predetermined amount dividing module 803. In many embodiments, predetermined amount dividing module 803 can store computing instructions configured to run on one or more processing modules and perform one or more acts of method 500 (FIG. 5) (e.g., activity 503 (FIG. 5)).

In many embodiments, system 800 can comprise non-transitory memory storage module 804. Memory storage module 804 can be referred to as cumulative number determining module 804. In many embodiments, cumulative number determining module 804 can store computing instructions configured to run on one or more processing modules and perform one or more acts of method 500 (FIG. 5) (e.g., activity 504 (FIG. 5)).

In many embodiments, system 800 can comprise non-transitory memory storage module 805. Memory storage module 805 can be referred to as cumulative number entering module 805. In many embodiments, cumulative number entering module 805 can store computing instructions configured to run on one or more processing modules and perform one or more acts of method 500 (FIG. 5) (e.g., activity 505 (FIG. 5)).

In many embodiments, system 800 can comprise non-transitory memory storage module 806. Memory storage module 806 can be referred to as segment number determining module 806. In many embodiments, segment number determining module 806 can store computing instructions configured to run on one or more processing modules and perform one or more acts of method 500 (FIG. 5) (e.g., activity 506 (FIG. 5)).

In many embodiments, system 800 can comprise non-transitory memory storage module 807. Memory storage module 807 can be referred to as subtracting module 807. In many embodiments, subtracting module 807 can store computing instructions configured to run on one or more processing modules and perform one or more acts of method 500 (FIG. 5) (e.g., activity 507 (FIG. 5)).

In many embodiments, system 800 can comprise non-transitory memory storage module 808. Memory storage module 808 can be referred to as binary search module 808. In many embodiments binary search module 808 can store computing instructions configured to run on one or more processing modules and perform one or more acts of method 500 (FIG. 5) (e.g., activity 508 (FIG. 5)).

Figure 9:
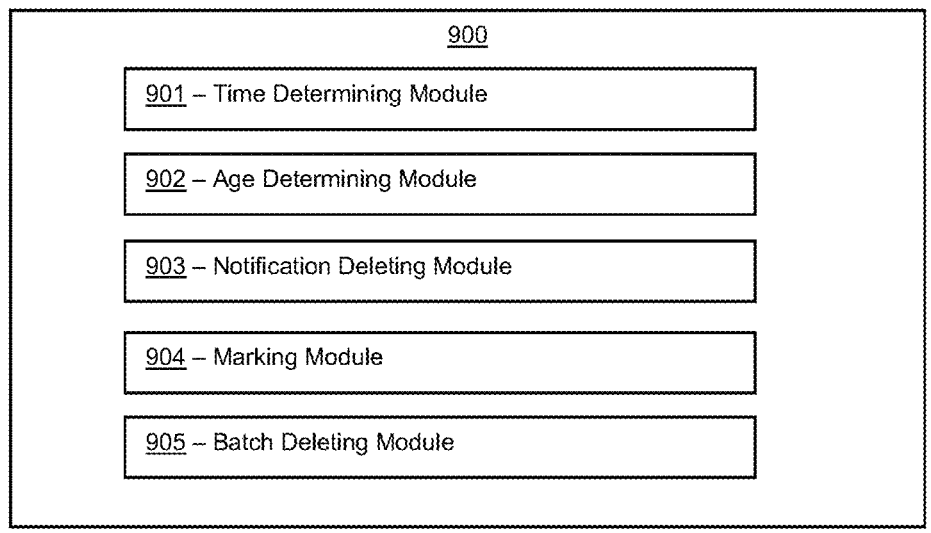
FIG. 9 illustrates a representative block diagram of a system, according to an additional embodiment.

Turning ahead in the drawings, FIG. 9 illustrates a block diagram of a system 900 that can be employed for electronic notification queues. System 900 is merely exemplary and embodiments of the system are not limited to the embodiments presented herein. System 900 can be employed in many different embodiments or examples not specifically depicted or described herein. In some embodiments, certain elements or modules of system 900 can perform various procedures, processes, and/or activities of method 600 (FIG. 6). In these or other embodiments, the procedures, processes, and/or activities of method 600 (FIG. 6) can be performed by other suitable elements or modules of system 900.

Generally, therefore, system 900 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 900 described herein.

In many embodiments, system 900 can comprise non-transitory memory storage module 901. Memory storage module 901 can be referred to as time determining module 901. In many embodiments, time determining module 901 can store computing instructions configured to run on one or more processing modules and perform one or more acts of method 600 (FIG. 6) (e.g., activity 601 (FIG. 6)).

In many embodiments, system 900 can comprise non-transitory memory storage module 902. Memory storage module 902 can be referred to as age determining module 902. In many embodiments, age determining module 902 can store computing instructions configured to run on one or more processing modules and perform one or more acts of method 600 (FIG. 6) (e.g., activity 602 (FIG. 6)).

In many embodiments, system 900 can comprise non-transitory memory storage module 903. Memory storage module 903 can be referred to as notification deleting module 903. In many embodiments, notification deleting 903 can store computing instructions configured to run on one or more processing modules and perform one or more acts of method 600 (FIG. 6) (e.g., activity 603 (FIG. 6)).

In many embodiments, system 900 can comprise non-transitory memory storage module 904. Memory storage module 904 can be referred to as marking module 904. In many embodiments marking module 904 can store computing instructions configured to run on one or more processing modules and perform one or more acts of method 600 (FIG. 6) (e.g., activity 604 (FIG. 6)).

In many embodiments, system 900 can comprise non-transitory memory storage module 905. Memory storage module 905 can be referred to as batch deleting module 905. In many embodiments, batch deleting module 905 can store computing instructions configured to run on one or more processing modules and perform one or more acts of method 600 (FIG. 6) (e.g., activity 605 (FIG. 6)).

Although systems and methods for electronic notification queues have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-9 may be modified, and that the foregoing discussion of certain of these embodiments does not necessarily represent a complete description of all possible embodiments. For example, one or more of the procedures, processes, or activities of FIGS. 4-6 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:
1. A system comprising:
one or more processors; and
one or more non-transitory computer-readable media storing computing instructions that, when executed on the one or more processors, cause the one or more processors to perform operations comprising:
 storing one or more notifications in a central data store, wherein storing the one or more notifications in the central data store comprises storing at most a maximum number of notifications in the central data store when the one or more notifications were created for a shorter amount of time than a predetermined amount of time;
 receiving a new notification;
 determining a respective number of notifications in each respective segment of a plurality of approximately equal segments by subtracting a cumulative number of notifications in the plurality of approximately equal segments from a preceding number of notifications in a preceding segment of the plurality of approximately equal segments;
 determining a number of the one or more notifications using the respective number of notifications in each respective segment of the plurality of approximately equal segments, wherein determining the number of the one or more notifications further comprises determining the number of the one or more notifications using a binary search algorithm, and wherein an interval of the binary search algorithm comprises a time period between a reclamation pointer and an ingestion pointer;

when the number of the one or more notifications is equal to or greater than the maximum number of notifications, removing, from the central data store, at least one notification of the one or more notifications; and before or after removing the at least one notification, storing the new notification in the central data store.

2. The system of claim 1, wherein storing the one or more notifications in the central data store comprises:

receiving, from a first electronic device of a first user of one or more users, a first user preference of one or more user preferences defining the maximum number of notifications; and receiving, from a second electronic device of a second user of the one or more users, a second user preference of the one or more user preferences defining a predetermined amount of time.

3. The system of claim 1, wherein the computing instructions, when executed on the one or more processors, further cause the one or more processors to perform an operation comprising:

when the number of the one or more notifications is equal to or greater than the maximum number of the notifications:
creating a cumulative count table; and
determining, using the cumulative count table, a number of notifications of the one or more notifications.

4. The system of claim 1, wherein removing, from the central data store, the at least one notification of the one or more notifications comprises:

marking an oldest notification of the one or more notifications for deletion; and batch deleting one or more marked notifications of the one or more notifications at a predetermined point in time, wherein the one or more notifications marked for deletion comprises the oldest notification.

5. The system of claim 1, wherein the computing instructions, when executed on the one or more processors, further cause the one or more processors to perform operations comprising:

determining when a notification of the one or more notifications was delivered before a predetermined point in time; and when the notification of the one or more notifications was delivered before the predetermined point in time, removing the notification of the one or more notifications from the central data store.

6. The system of claim 1, wherein the predetermined amount of time is determined by placing the ingestion pointer at a head of an electronic queue.

7. The system of claim 6, wherein the predetermined amount of time is further determined by placing the reclamation pointer at a tail of the electronic queue, and wherein the reclamation pointer comprises a past time and a past date associated with one or more user preferences and the ingestion pointer.

8. The system of claim 1, wherein the one or more notifications comprise one or more of an email, a text message, or a push notification.

9. The system of claim 1, wherein the computing instructions, when executed on the one or more processors, further cause the one or more processors to perform an operation comprising:

facilitating delivery of the new notification of the one or more notifications from the central data store to one or more electronic devices of an organization.

10. The system of claim 1, wherein the central data store is accessible by two or more electronic devices of an organization.

11. A method implemented via execution of computing instructions configured to run at one or more processors and configured to be stored at non-transitory computer-readable media, the method comprising:

storing one or more notifications in a central data store, wherein storing the one or more notifications in the central data store comprises storing at most a maximum number of notifications in the central data store when the one or more notifications were created for a shorter amount of time than a predetermined amount of time;

receiving a new notification;

determining a respective number of notifications in each respective segment of a plurality of approximately equal segments by subtracting a cumulative number of notifications in the plurality of approximately equal segments from a preceding number of notifications in a preceding segment of the plurality of approximately equal segments;

determining a number of the one or more notifications using the respective number of notifications in each respective segment of the plurality of approximately equal segments, wherein determining the number of the one or more notifications further comprises determining the number of the one or more notifications using a binary search algorithm, and wherein an interval of the binary search algorithm comprises a time period between a reclamation pointer and an ingestion pointer;

when the number of the one or more notifications is equal to or greater than the maximum number of notifications, removing, from the central data store, at least one notification of the one or more notifications; and before or after removing the at least one notification, storing the new notification in the central data store.

12. The method of claim 11, wherein storing the one or more notifications in the central data store comprises:

receiving, from a first electronic device of a first user of one or more users, a first user preference of one or more user preferences defining the maximum number of notifications; and receiving, from a second electronic device of a second user of the one or more users, a second user preference of the one or more user preferences defining a predetermined amount of time.

13. The method of claim 11, further comprising:

when the number of the one or more notifications is equal to or greater than the maximum number of the notifications:
creating a cumulative count table; and
determining, using the cumulative count table, a number of notifications of the one or more notifications.

14. The method of claim 11, wherein removing, from the central data store, the at least one notification of the one or more notifications comprises:

marking an oldest notification of the one or more notifications for deletion; and batch deleting one or more marked notifications of the one or more notifications at a predetermined point in time, wherein the one or more notifications marked for deletion comprises the oldest notification.

15. The method of claim 11 further comprising:

determining when a notification of the one or more notifications was delivered before a predetermined point in time; and when the notification of the one or more notifications was delivered before the predetermined point in time, removing the notification of the one or more notifications from the central data store.

16. The method of claim 11, wherein the predetermined amount of time is determined by placing the ingestion pointer at a head of an electronic queue.

17. The method of claim 16, wherein the predetermined amount of time is further determined by placing the reclamation pointer at a tail of the electronic queue, and wherein the reclamation pointer comprises a past time and a past date associated with one or more user preferences and the ingestion pointer.

18. The method of claim 11, wherein the one or more notifications comprise one or more of an email, a text message, or a push notification.

19. The method of claim 11 further comprising:
facilitating delivery of the new notification of the one or more notifications from the central data store to one or more electronic devices of an organization.

20. The method of claim 11, wherein the central data store is accessible by two or more electronic devices of an organization.

* * * * *